US011087590B2

(12) United States Patent
Hsu et al.

(10) Patent No.: US 11,087,590 B2
(45) Date of Patent: Aug. 10, 2021

(54) SYSTEM PROVIDING GAMING OF HIGHER PAYOUT ODDS UNDER BACCARAT RULES

(71) Applicant: Tien-Shu Hsu, Taichung (TW)

(72) Inventors: Shun-Tsung Hsu, Taichung (TW); Chang-Yi Wang, Taichung (TW)

(73) Assignee: Tien-Shu Hsu, Taichung (TW)

( * ) Notice: Subject to any disclaimer, the term of this patent is extended or adjusted under 35 U.S.C. 154(b) by 58 days.

(21) Appl. No.: 16/533,522

(22) Filed: Aug. 6, 2019

(65) Prior Publication Data

US 2021/0043028 A1 Feb. 11, 2021

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.

CPC ........ *G07F 17/323* (2013.01); *G07F 17/3244* (2013.01); *G07F 17/3293* (2013.01)

(58) Field of Classification Search

USPC .............................. 463/1, 11, 20, 22, 39, 40

See application file for complete search history.

(56) References Cited

U.S. PATENT DOCUMENTS

| | | | | |
|---|---|---|---|---|
| 7,922,587 | B2 | 4/2011 | Chun | |
| 8,651,930 | B2 * | 2/2014 | Hsu | G07F 17/322 463/13 |
| 2008/0230993 | A1 | 9/2008 | Chun | |
| 2017/0337779 | A1 | 11/2017 | Takasaki et al. | |

* cited by examiner

*Primary Examiner* — Adetokunbo O Torimiro

(74) *Attorney, Agent, or Firm* — Muncy, Geissler, Olds & Lowe, P.C.

(57) ABSTRACT

The present invention is a system providing a game of higher payout odds under baccarat rules. A control element first determines whether betting information satisfies an activation condition, and if so, the control element further determines whether a game result satisfies an additional payout condition. If the game result satisfies the additional payout condition, a payout element additionally calculates and generates an additional payout score. Accordingly, the present invention provides a user with a game means of higher payout odds by using existing betting zones, so as to satisfy the need of seeking for excitement for the user.

10 Claims, 19 Drawing Sheets

SYSTEM PROVIDING GAMING OF HIGHER PAYOUT ODDS UNDER BACCARAT RULES

FIELD OF THE INVENTION

The present invention relates to baccarat, and particularly to a system providing a gaming means of higher payout odds under baccarat rules.

BACKGROUND OF THE INVENTION

In a playing card table game, a betting tabletop is provided for users to bet on different game outcomes. The betting tabletop provides different game outcomes with different payout odds on the basis of probabilities of the game outcomes. When the game yields a game outcome that a user bets on, a payout is made to the player according to the payout odd and the betting amount of the user.

Current common playing card table games include baccarat, blackjack and Texas poker. The baccarat, allowing many users to bet on the banker or player, offering a larger extent of game flexibility and considered the fairest poker table game, is highly popular among users.

For example, the U.S. Patent Publication No. 20170337779 A1, the U.S. Pat. No. 7,922,587 B2, the U.S. Pat. No. 8,651,930 B2, and the U.S. Patent Publication No. 20080230993 A1 disclose that, a baccarat betting table includes five betting zones, namely, BANKER, TIE, PLAYER, BANKER PAIR and PLAYER PAIR, and a highest payout odd of about 11-to-1 is provided; that is, the highest payout odd provided is only 11 (the highest payout odd adopted by most baccarat games). Compared to other multi-user games, such as the highest payout odd of 190-to-1 (Trips) of dice games and the highest payout odd of 35-to-1 (one single number) of roulette games, the payout odds of baccarat games are relatively lower, which may not give a sense of winning big with a small bet and excitement.

Therefore, the U.S. Patent Publication No. 2017037779 A1, the U.S. Pat. No. 7,922,587 B2, and the U.S. Patent Publication No. 20080230993 A1 provide designs of additional betting zones to allow users to obtain additional rewards; the U.S. Pat. No. 8,651,930 B2 uses a random odd to provide a user with a higher payout odd to increase the reward.

With respect to the approaches above, due to changes in betting zones and payout odds of baccarat, a new tabletop needs to be designed, and gaining trust of users within short periods of time may also be challenging. Hence, applications needs are obvious not satisfied.

SUMMARY OF THE INVENTION

An object of the present invention is to disclose a gaming that provides a user with higher payout odds on the basis of existing betting zones, so as to satisfy the need of seeking for excitement for the user.

According to the above object, the present invention provides a system providing a gaming of higher payout odds on the basis of baccarat rules for a user to play a baccarat game. The baccarat game includes a banker and a player, the banker and the player obtain respective poker card pattern, and each of the poker card patterns is one selected from a plurality of poker card combinations. The baccarat game obtains a game result according to the poker card pattern of the banker and the poker card pattern of the player. The system includes a betting tabletop, a dealing element, and payout element and a control element.

The betting tabletop includes five betting zones comprising respective payout odds defined according to baccarat rules. The five betting zones are respectively BANKER, TIE, PLAYER, BANKER PAIR and PLAYER PAIR, are individually for the user to bet on. Each of the five betting zones comprises a betting amount generated according to the bet placed by the user. The betting tabletop generates a betting information according to the betting amounts of the five betting zones. The dealing element allows the banker and the player to obtain the respective poker card pattern after the user finishes betting on the five betting zones and generates the game result. The payout element obtains the betting information and the game result, and the payout element calculates and generates a payout score to pay the user according to the corresponding betting amount and the corresponding payout odds while the betting zone matching the game result. The control element is connected to the betting tabletop, the dealing element and the payout element.

The control element sequentially performs step S1: a determination procedure, step S2: an activation procedure, and step S3: an additional payout procedure, which are respectively described below.

In the determination procedure of step S1, the control element determines whether the betting information satisfies an activation condition, and the control element generates an activation signal if the activation condition is satisfied. The activation condition is that, at least one betting combination is satisfied, wherein the betting combination is selected from at least one of the five betting zones, and the betting combination is satisfied when the user betting all in on the at least one betting zone of the betting combination.

In the activation procedure of step S2, when the activation signal is presented, the control element determines whether the game result satisfies an additional payout condition, and the control element generates an additional payout signal if the additional payout condition is satisfied. The additional payout condition is that apart from the at least one betting zone of the betting combination satisfying the activation condition that matches the game result, the poker card pattern of the banker and the poker card pattern of the player constituting of the game result further match a designated card pattern which includes an appearance probability.

In the additional payout procedure of step S3, when the additional payout signal is presented, the control element notifies the payout element, allowing the payout element additionally calculating and generating an additional payout score according to the betting amount of the betting zone corresponding to the game result and a designated payout odds which is predetermined, and the payout element paying the additional payout score to the user, wherein a value relationship between the designated odds and the appearance probability of the designated card pattern is a negative correlation.

Accordingly, the control element of the present invention first determines whether the betting information (that is, the betting amounts of the user on the five betting zones) satisfies the activation conditions; when the activation condition is satisfied, the control element further determines whether the game result satisfies the additional payout condition; when the additional payout condition is satisfied, the control element notifies the payout element to have the payout element additionally calculate and generate the additional payout score according to the betting amount of the betting zone corresponding to the game result and the designated odds. Thus, the invention provides betting options which have higher payout odds with the existing five betting zone by changing the activation condition, the additional payout condition and the designated odds, thereby satisfying the need for the user to play with higher payout odds.

DETAILED DESCRIPTION OF THE PREFERRED EMBODIMENTS

Details and technical contents of the present invention are further described in the embodiments below. It should be understood that the embodiments are for illustration purposes and are not to be construed as limitations to the present invention.

Figure 1:
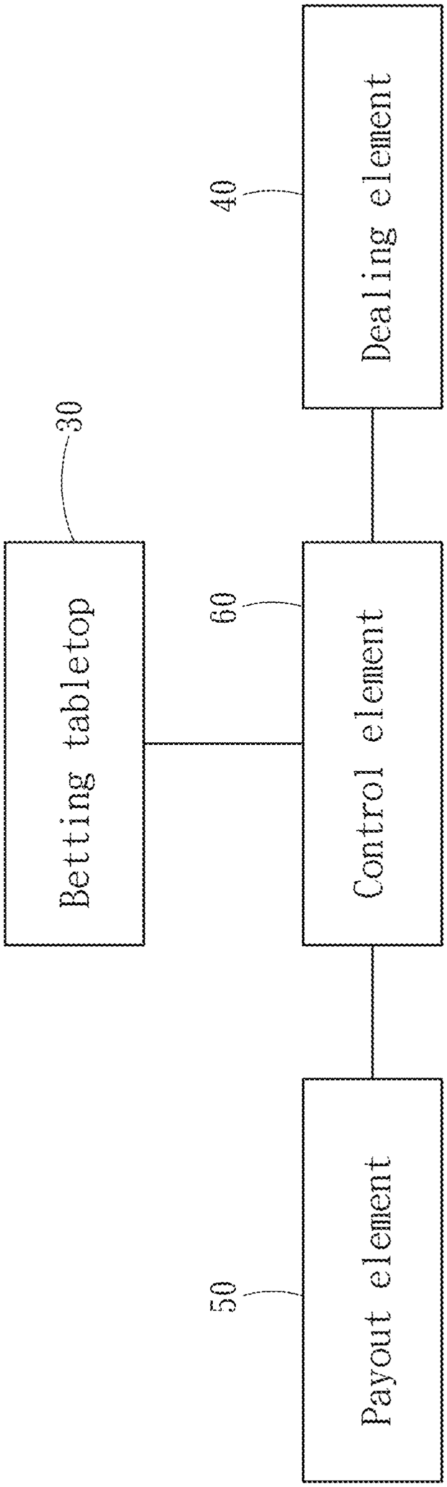
FIG. 1 is a block diagram of a system of the present invention.

Referring to FIGS. 1, 2, 3 and 4, the present invention provides a system providing a gaming of higher payout odds under baccarat rules for a user to conduct a baccarat game. The baccarat game includes a banker 10 and a player 20. The banker 10 and the player 20 obtain respective poker card pattern 11, 21 according to baccarat rules, wherein each of the poker card pattern 11, 21 is one selected from a plurality of poker card combinations. One deck of poker cards consists of 52 cards of different suits (spades, hearts, diamonds and clubs) and numerals (1 to 10, J, Q and K), as well as two joker cards. In a common baccarat game, joker cards are usually not used, and the game can be conducted by using one deck or using multiple decks simultaneously. In the present invention, the poker card combinations of the poker card pattern 11, 21 is at least two cards and is at most three cards, and the baccarat game obtains a game result according to the poker card pattern 11 of the banker 10 and the poker card pattern 21 of the player 20. As shown in FIG. 1, the system includes a betting tabletop 30, a dealing element 40, a payout element 50 and a control element 60.

Figure 2:
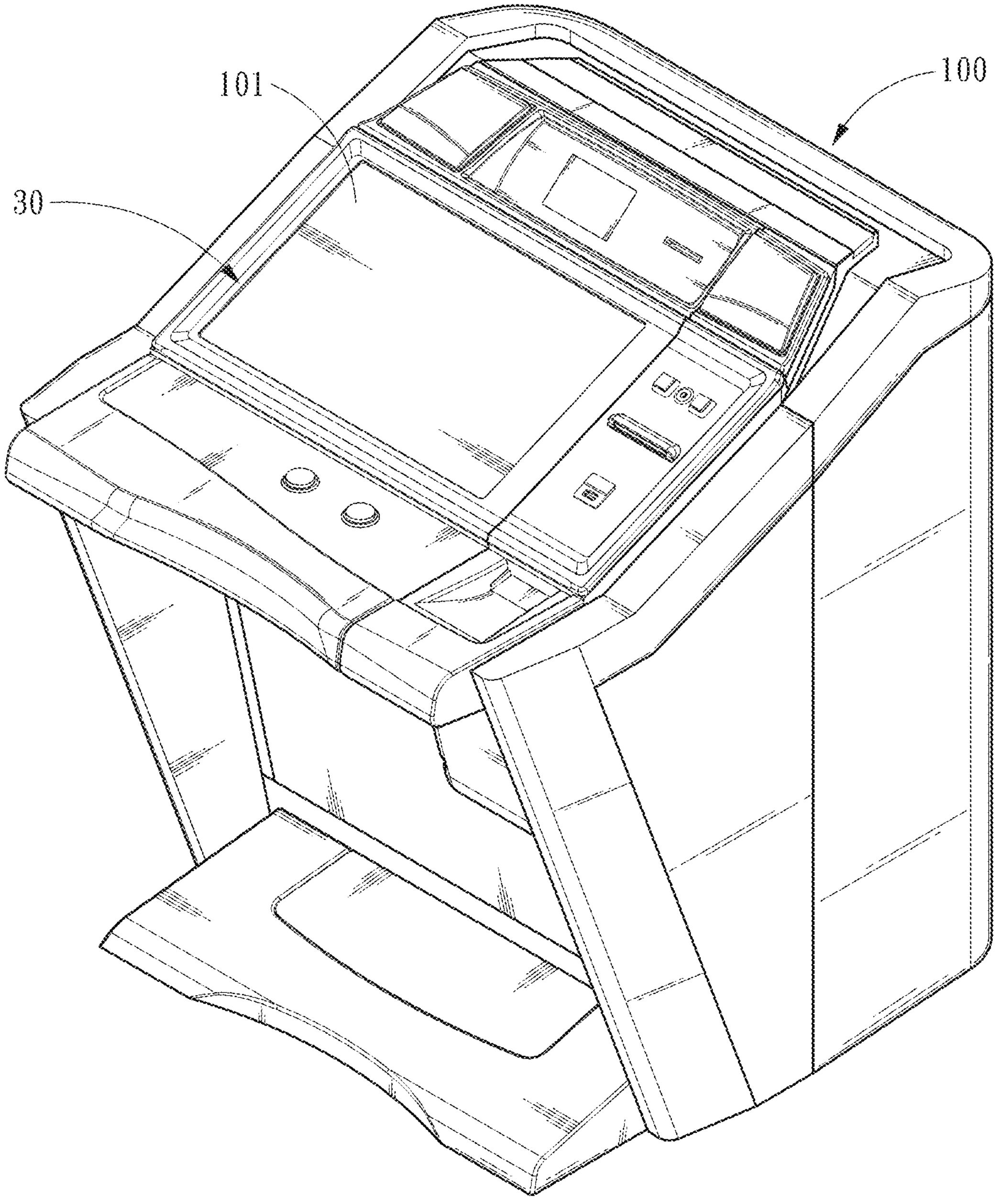
FIG. 2 is an appearance diagram of a machine of the present invention.
Figure 3:
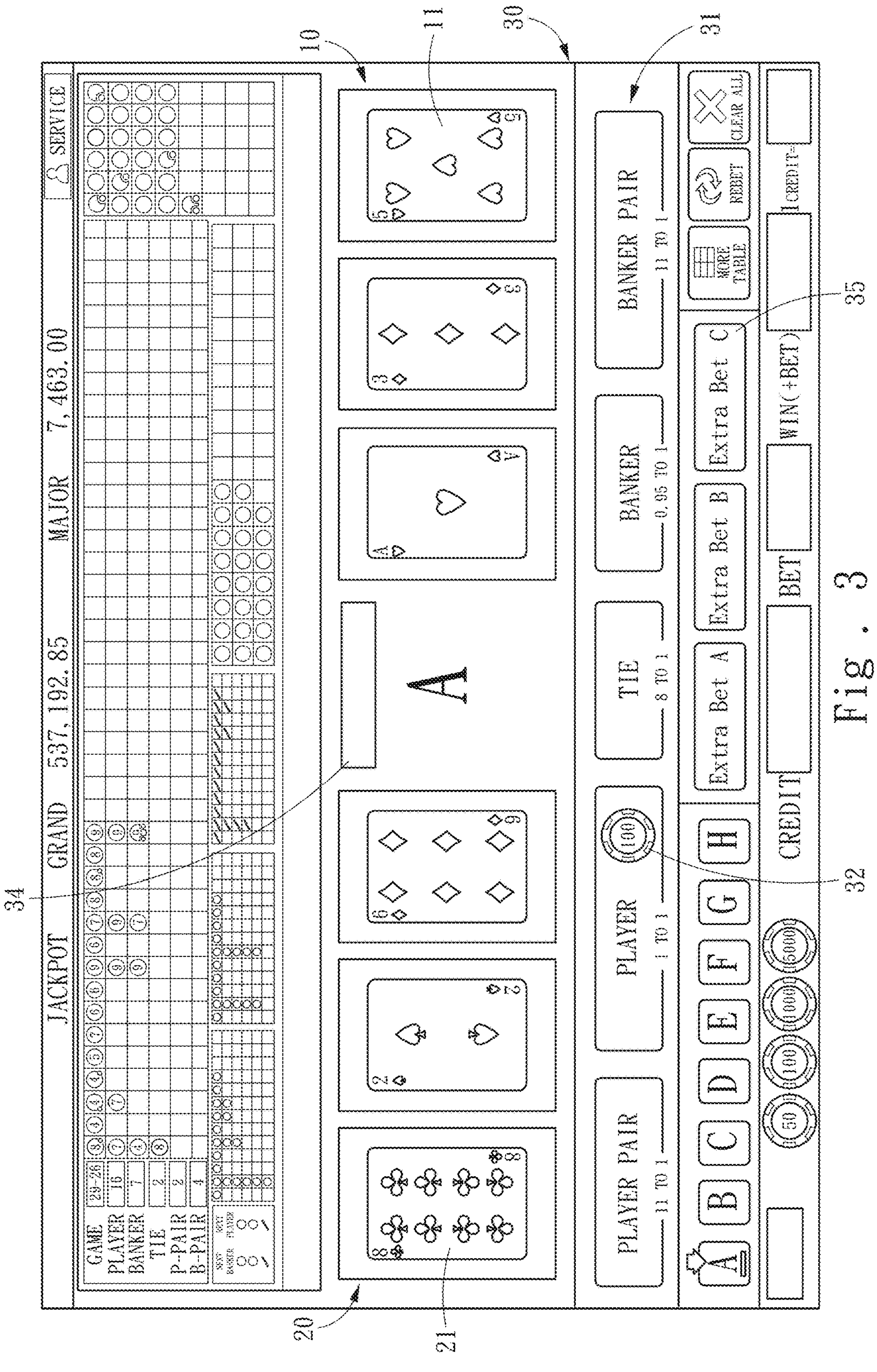
FIG. 3 is a schematic diagram of a game operation interface of the present invention.

In practice, the betting tabletop 30, the dealing element 40, the payout element 50 and the control element 60 shown in FIG. 1 can be integrated in a gaming machine 100 shown in FIG. 2. The gaming machine 100 includes a display operation interface 101. The display operation interface 101 is provided for displaying the betting tabletop 30, and the display operation interface 101 is usually a touch screen comprising both display and input functions. The betting tabletop 30 includes five betting zones 31. The five betting zones 31 comprise respective payout odds defined according to baccarat rules, and the five betting zones 31 are respectively BANKER, TIE, PLAYER, BANKER PAIR and PLAYER PAIR. The five betting zones 31 are individually for the user to bet on, and each of the five betting zones 31 comprises a betting amount (which is represented by a chip 32, and a betting amount is 0 if no chip 32 is in the five betting zone 31), the betting amount is generated according to the bet placed by the user. Further, the betting tabletop 30 generates a betting information according to the betting amounts of the five betting zones 31.

Figure 4:
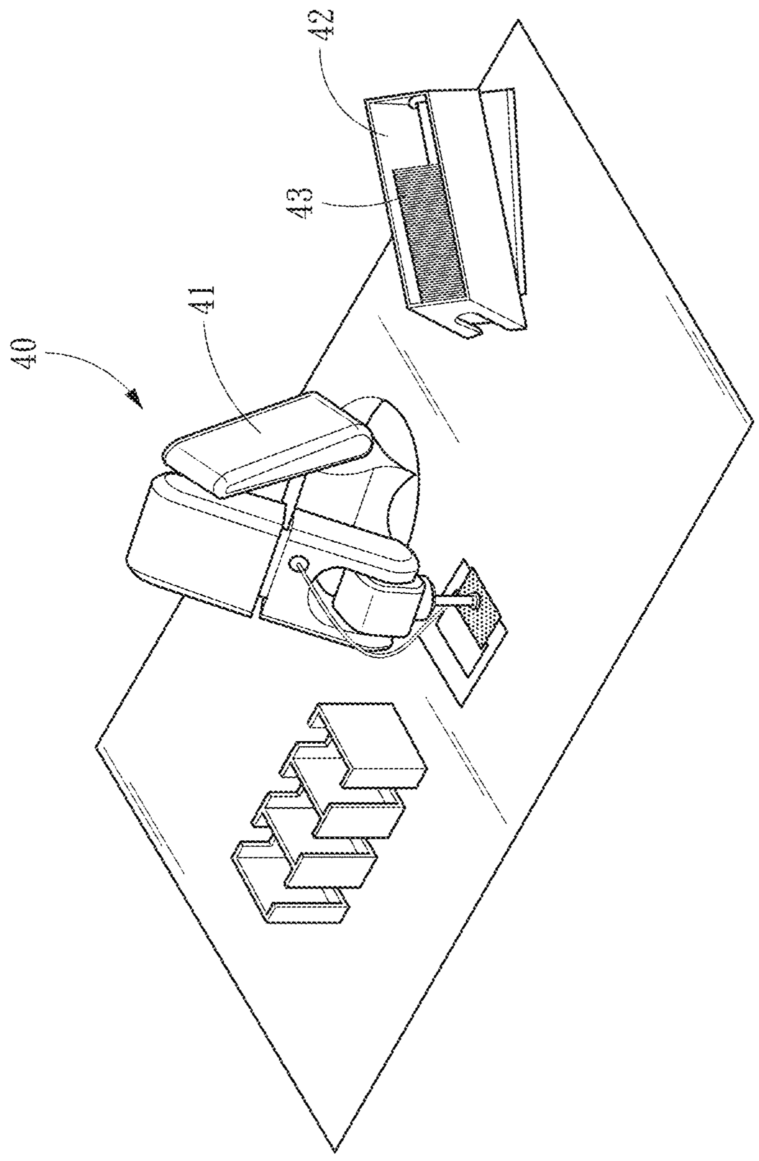
FIG. 4 is a schematic diagram of a dealing element of the present invention.

The dealing element 40 comprises two implementations. In the first implementation, the dealing element 40 is a random number generating element and is an electronic component. Thus, the dealing element 40 can be integrated in the gaming machine 100, so as to allow the banker 10 and the player 20 to obtain the respective poker card pattern 11, 21. In the second implementation, the dealing element 40 can be an automated dealing arm 41 which is substance (as shown in FIG. 4). The automated dealing arm 41 is usually uprighted next to the gaming machine 100, and draws one of a plurality of poker cards 43 from a card box 42 at a time. In practice, the automated dealing arm 41 is shared with multiple gaming machines 100 to save establishment costs. After the user finishes the betting on the five betting zones 31, the dealing element 40 starts card dealing to allow the banker 10 and the player 20 obtaining the respective poker card pattern 11, 21, and generating the game result accordingly.

As shown in FIG. 1, the payout element 50 obtains the betting information and the game result. The payout element 50 calculates and generates a payout score to pay the user according to the corresponding betting amount and the corresponding payout odds while the five betting zones 31 matching the game result. The control element 60 is connected to the betting tabletop 30, the dealing element 40 and the payout element 50.

Figure 5:
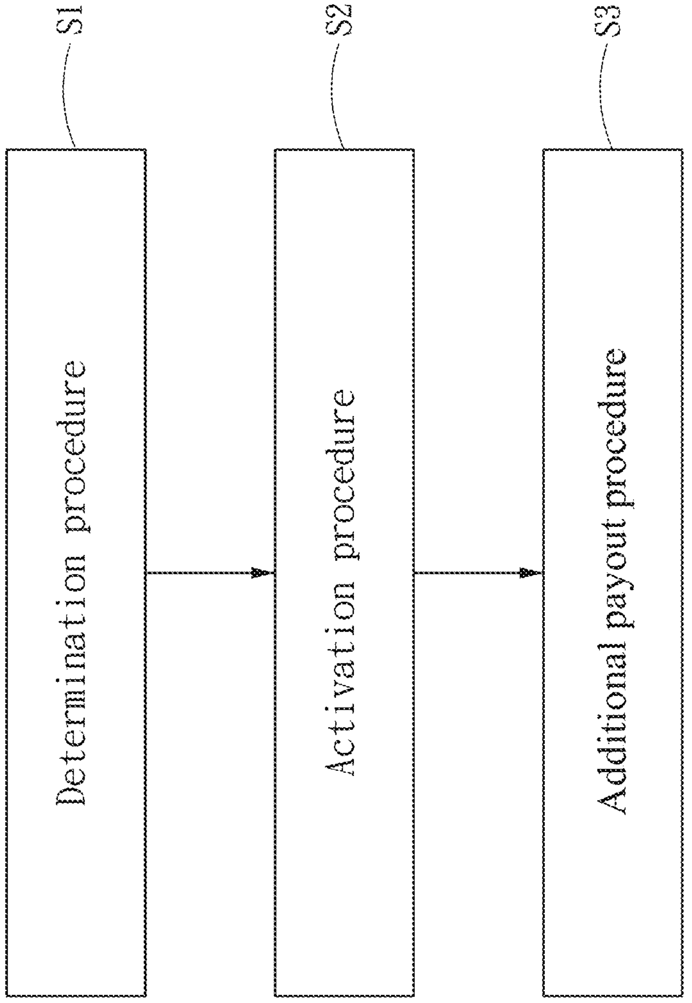
FIG. 5 is a flowchart of steps of the present invention.

Referring to FIG. 5, the control element 60 sequentially performs step S1: a determination procedure; step 2: an activation procedure; and step S3: an additional payout procedure. The steps are respectively described in detail below.

The determination procedure of step S1 is first performed. The control element 60 determines whether the betting information satisfies an activation condition, the control element 60 generates an activation signal if the activation condition is satisfied. The activation condition is that, at least one betting combination is satisfied, wherein the betting combination is selected from at least one of the five betting zones 31, and the betting combination is satisfied when the user bets all in on the at least one betting zone 31 of the betting combination.

The activation procedure of step S2 is then performed. When the activation signal is presented, the control element 60 further determines whether the game result satisfies an additional payout condition, and the control element 60 generates an additional payout signal if the additional payout condition is satisfied. The additional payout condition is that, apart from the at least one of the five betting zones 31 of the betting combination satisfying the activation condition that matches the game result, the poker card pattern 11 of the banker 10 and the poker card pattern 21 of the player 20 forming the game result further matches a designated card pattern which includes an appearance probability.

The additional payout procedure of step S3 is finally performed. When the additional payout signal is presented, the control element 60 notifies the payout element 50 which is additionally calculating and generating an additional payout score in accordance with the betting amount of the betting zone 31 corresponding to the game result and a designated payout odds which is predetermined, and the payout element 50 pays the additional payout score to the user, wherein a value relationship between the designated payout odds and the appearance probability of the designated card pattern is negative correlation.

In addition, in the game design, the payout element 50 calculates and generates for multiple number of times that the payout score to be paid to the user. For example, the banker and the player first obtain respective two of the plurality of poker cards 43 which are 2, 2 and 7, 7, and the game has yet ended in such situation, because a third card needs to be drawn subsequently. However, BANKER PAIR and PLAYER PAIR are satisfied in such situation that the game has yet ended, and payout can be first made to the user which is betting on BANKER PAIR and PLAYER PAIR instead of making payout until the front of the third card is obtained.

As the steps described above, the betting zones 31 in the betting combination designated by the activation condition, the designated card pattern of the additional payout condition, and the designated payout odds are advance given and can be changed. More specifically, the types and quantities of the betting zones 31 are designated by the activation condition that can be changed by a service provider according to preferences of the user in different regions. Meanwhile, the designated card pattern and the designated payout odds can be changed according to local rules, degrees of profits sharing of a service provider to satisfy actual demands in use.

In general, the designated payout odds can be given much higher when the appearance probability of the designated card pattern gets lower. However, the designated payout odds is usually limited by local rules, and in the meantime a service provider needs to retain the deserved business profits. In other words, the designated payout odds is adjusted according to actual conditions rather than a constant value, so as to conform with criterion of local rules.

Several possible but non-limiting embodiments are set forth as below description.

First Embodiment

Referring to FIGS. 1, 6A, 6B and 6C, in this embodiment, the betting combination in the activation condition is "BANKER PAIR" in the betting zone 31, the additional payout condition is that "BANKER PAIR" in the betting zone 31 matches the game result which is constituted by the designated card pattern as Trips for the poker card pattern 11 of the banker 10.

Figure 6A:
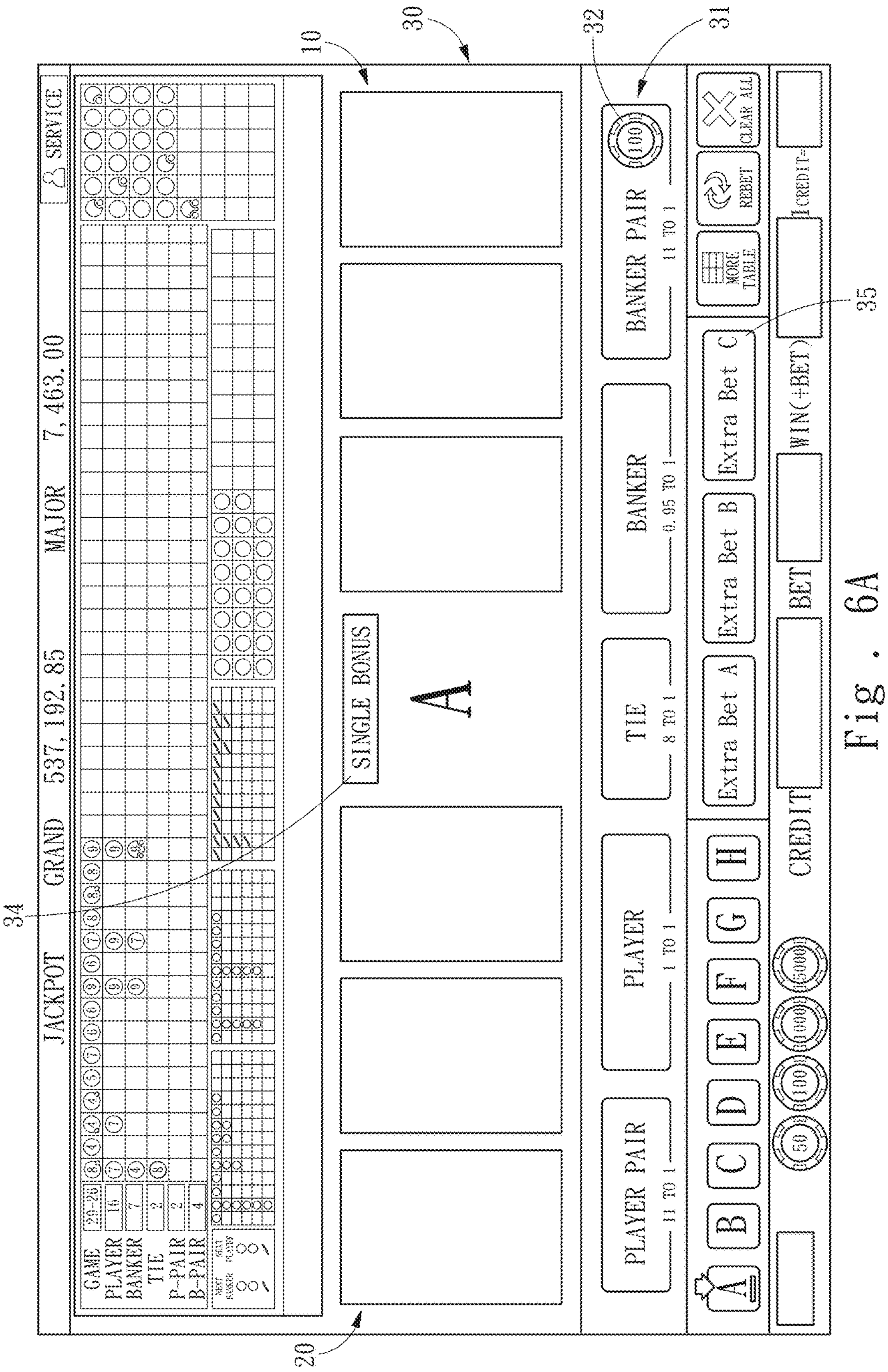
FIGS. 6A, 6B, and 6C are schematic diagrams according to a first embodiment of the present invention.

At this point, as shown in FIG. 6A, when the user bets on "BANKER PAIR" (the chip 32 is presented on "BANKER PAIR" in the betting zone 31), the control element 60 determines that the betting information satisfies the activation condition and generates the activation signal.

Figure 6B:
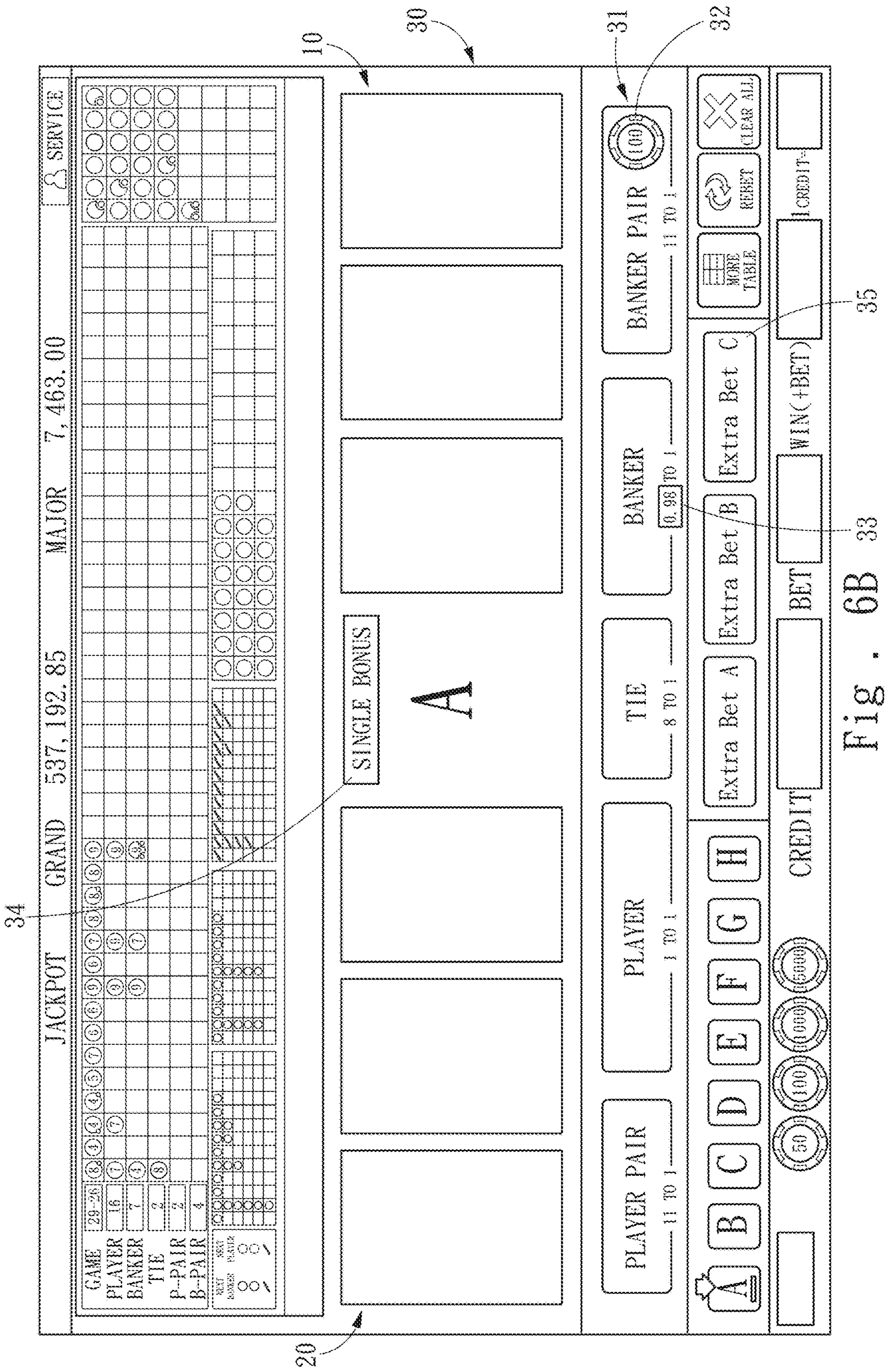

Next, as shown in FIG. 6B, in order to increase the fun in the game, after the user finishes the betting and before the payout element 50 generates the payout score, the control element 60 selects at least one of the five betting zones 31, and allow the payout odds of the selected betting zones 31 to be respectively replaced by a random odds 33; for example, in FIG. 6B, the payout odds "0.95" of "BANKER" is selected and replaced by "0.98". A time point at which the payout odds of the selected betting zones 31 is replaced by the random odds 33 before the game result is generated. When the random odds 33 is presented, the payout element 50 calculates and generates the payout score based on the random odds 33.

Figure 6C:
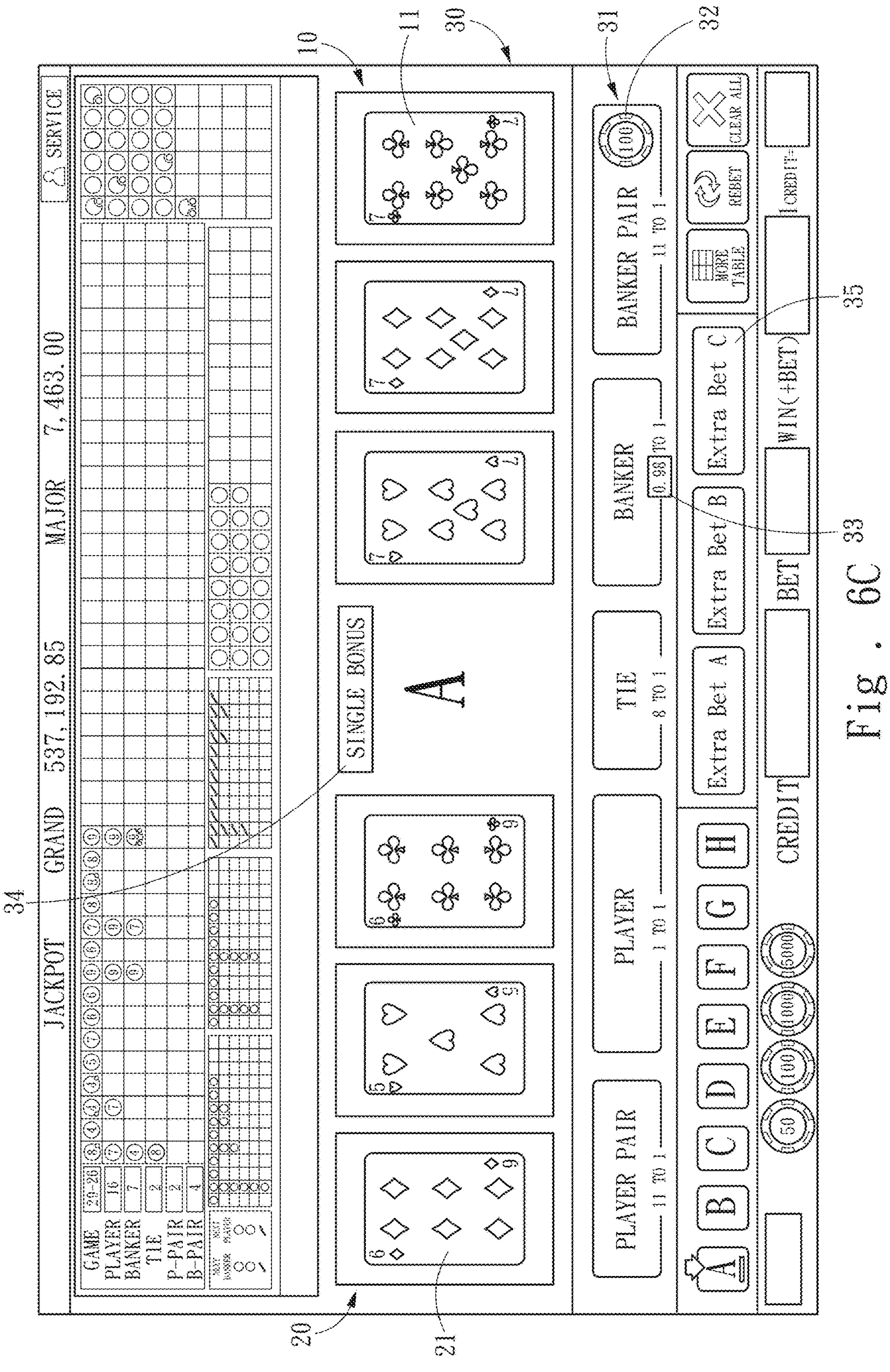

Next, as shown in FIG. 6C, the dealing element 40 starts dealing to allow the banker 10 and the player 20 obtaining the respective poker card patterns 11, 21, and generating the game result. The poker card pattern 11 is "7 of hearts, 7 of diamonds, and 7 of clubs" (Trips), and the poker card pattern 21 is "6 of diamonds, 5 of hearts, and 6 of clubs", and thus the game result is "PLAYER, BANKER PAIR".

Due to the presence of the activation signal, the control element 60 further determines whether the game result satisfies the additional payout condition. At this point, as shown in FIG. 6C, because the poker card pattern 11 of the banker 10 is "7 of hearts, 7 of diamonds, and 7 of clubs" (Trips), the control element 60 determines that the additional payout condition is satisfied and thus generates the additional payout signal. In the end, the payout element 50 additionally calculates and generates the additional payout score, and pays the additional payout score to the user.

Second Embodiment

Referring to FIGS. 1, 7A, 7B and 7C, in this embodiment, the betting combination in the activation condition is that the betting zone 31 is "PLAYER PAIR", the additional payout condition is that "PLAYER PAIR" in the betting zone 31 matches the game result which is constituted by the designated card pattern as Trips for the poker card pattern 21 of the player 20.

Figure 7A:
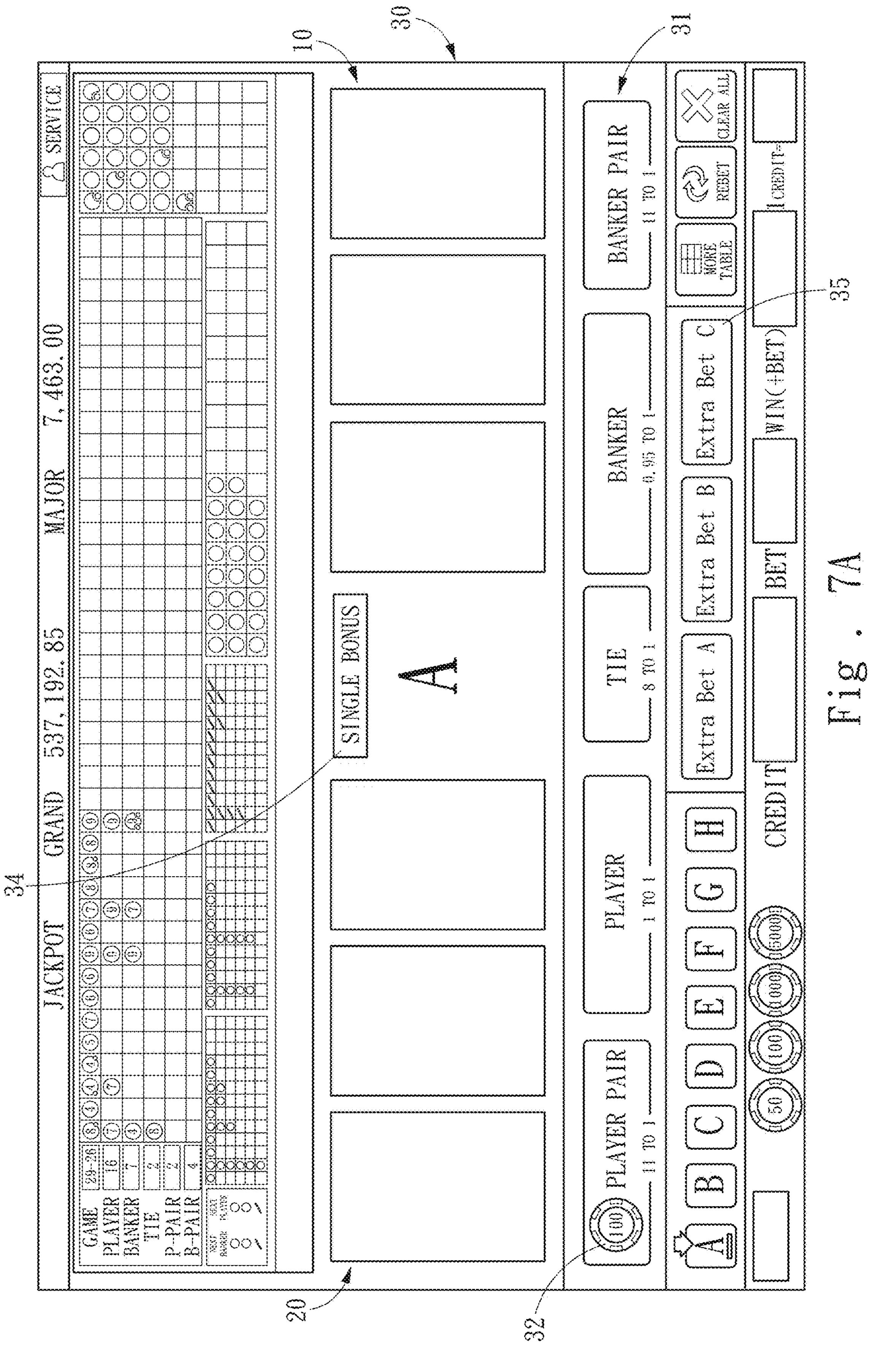
FIGS. 7A, 7B, and 7C are schematic diagrams according to a second embodiment of the present invention.

At this point, as shown in FIG. 7A, when the user bets on "PLAYER PAIR" (the chip 32 is presented on "PLAYER PAIR" in the betting zone 31), the control element 60 determines that the betting information satisfies the activation condition and generates the activation signal.

Figure 7B:
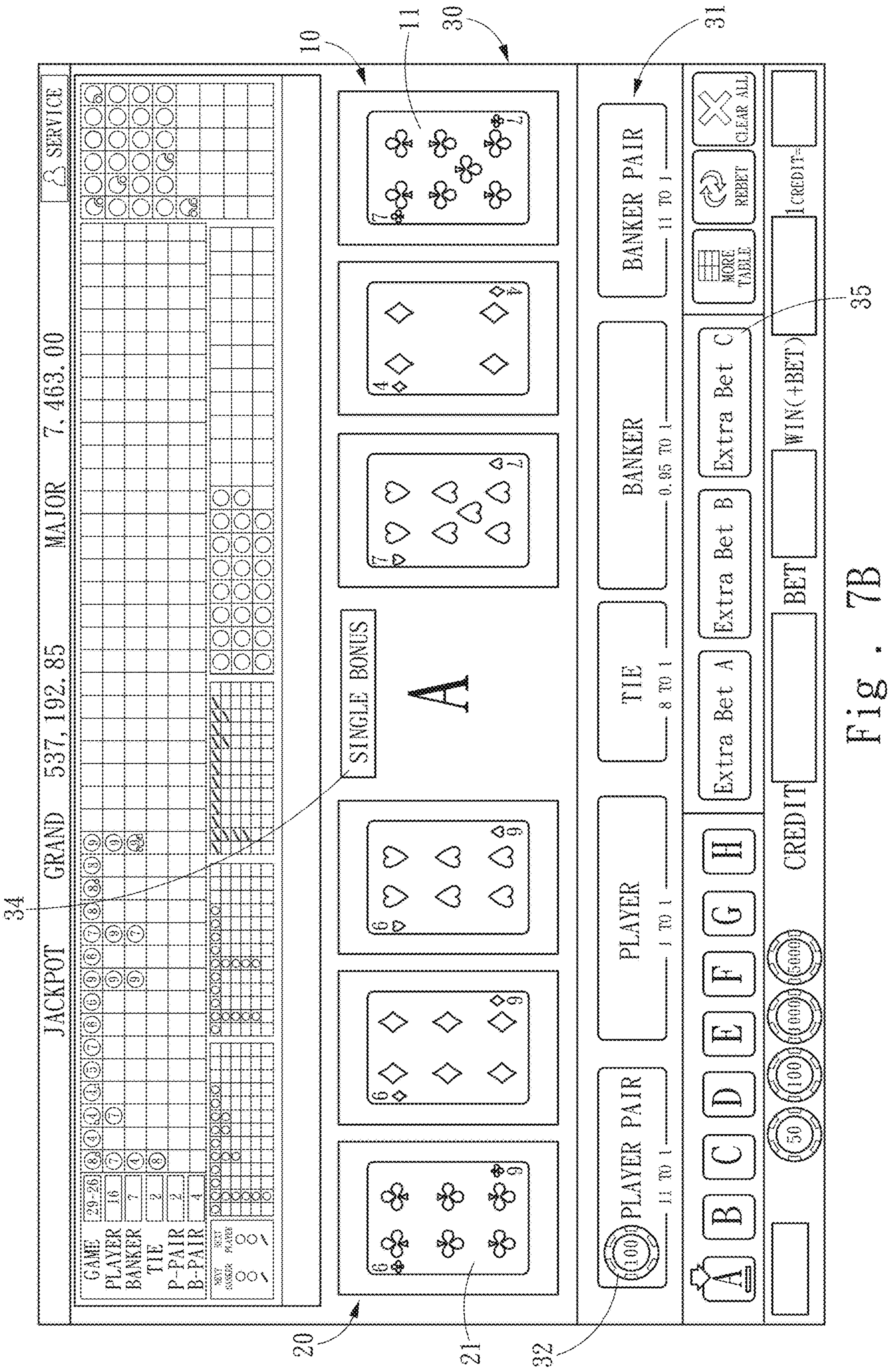

Next, as shown in FIG. 7B, the dealing element 40 starts dealing to allow the banker 10 and the player 20 obtaining the respective poker card pattern 11, 21, and generating the game result. The poker card pattern 11 is "7 of hearts, 4 of diamonds, and 7 of clubs", the poker card pattern 21 is "6 of clubs, 6 of diamonds, and 6 of hearts" (Trips), and thus the game result is "TIE, PLAYER PAIR".

Figure 7C:
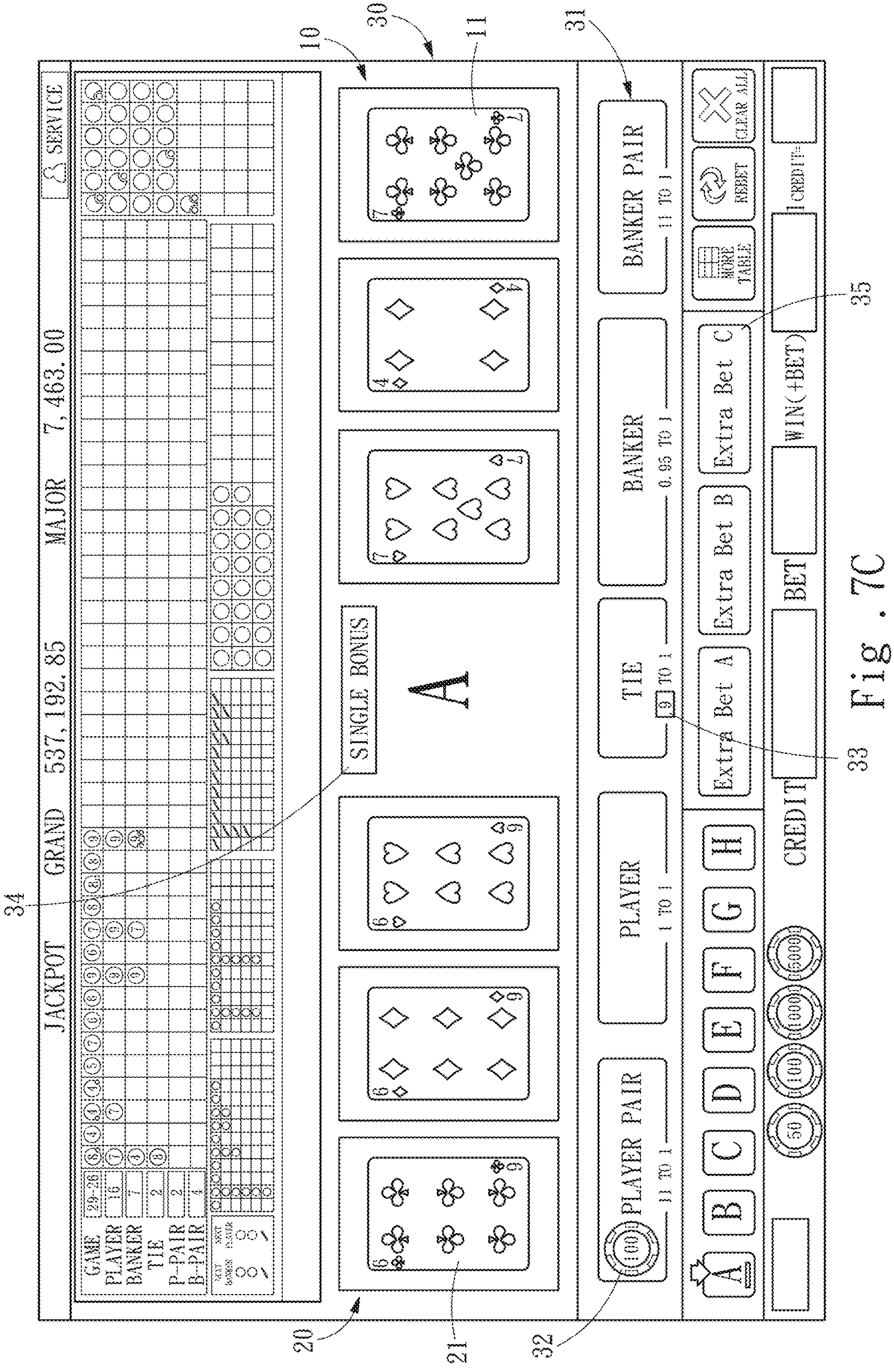

Then, as shown in FIG. 7C, the design of the random odds 33 is similarly included, and the payout odds "8" of "TIE" is replaced by the payout odds "9". The random odds 33 of this embodiment differs from that of the first embodiment is that, the time point at which the payout odds of the selected betting zones 31 is replaced by the random odds 33 after the game result is generated. That is, the game result is first generated and the random odds 33 is then generated. In this embodiment, the payout odds "8" of "TIE" is replaced by the payout odds "9" of the random odds 33, and thus the payout element 50 calculates and generates the payout score based on the random odds 33.

Due to the presence of the activation signal, the control element 60 further determines whether the game result satisfies the additional payout condition. At this point, as shown in FIG. 7C, the poker card pattern 21 of the player 20 is "6 of clubs, 6 of diamonds, and 6 of hearts" (Trips), and thus the control element 60 determines that the additional payout condition is satisfied and generates the additional payout signal. In the end, the payout element 50 additionally calculates and generates the additional payout score, and pays the additional payout score to the user.

Third Embodiment

Figure 8A:
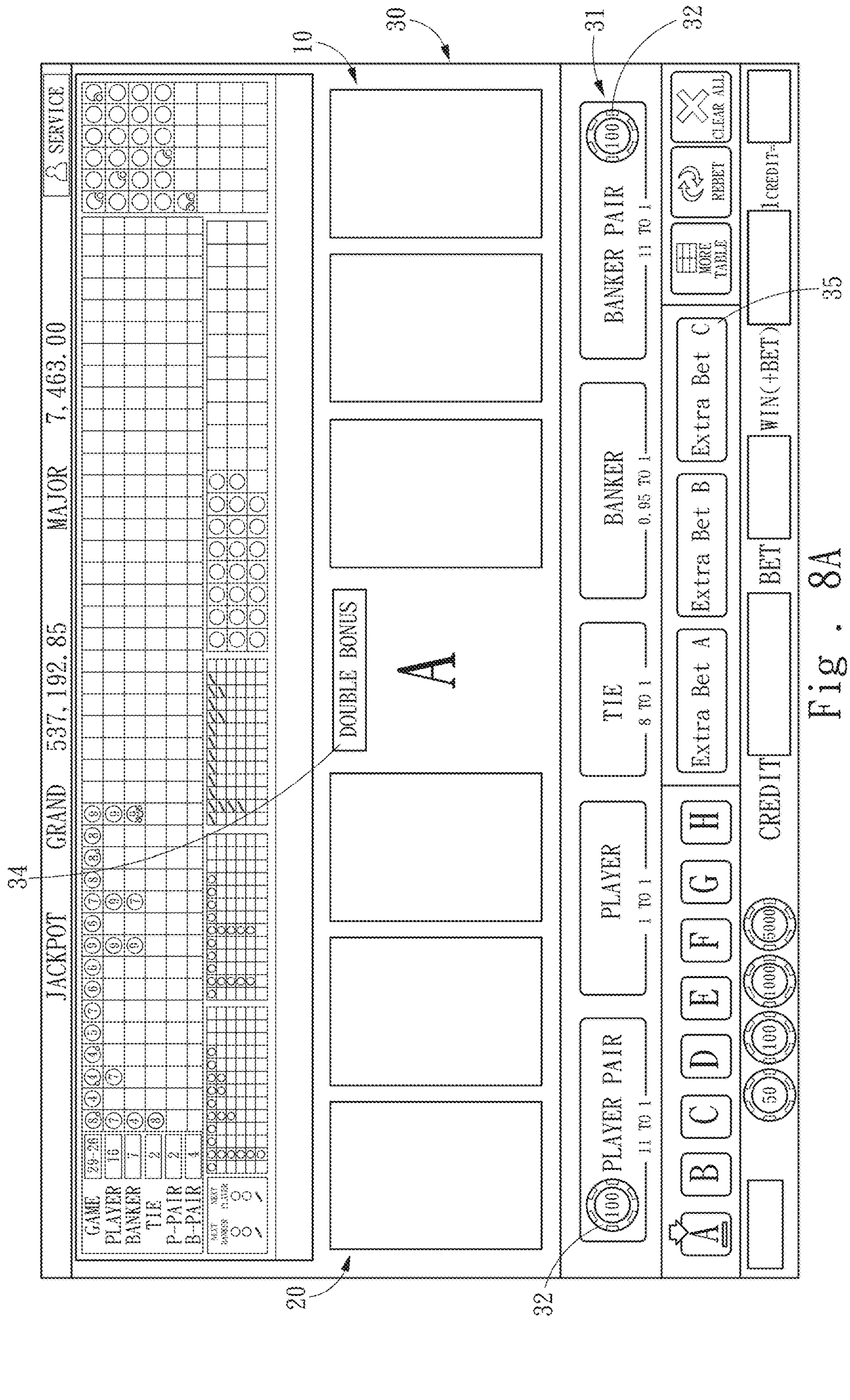
FIGS. 8A and 8B are schematic diagrams according to a third embodiment of the present invention.
Figure 8B:
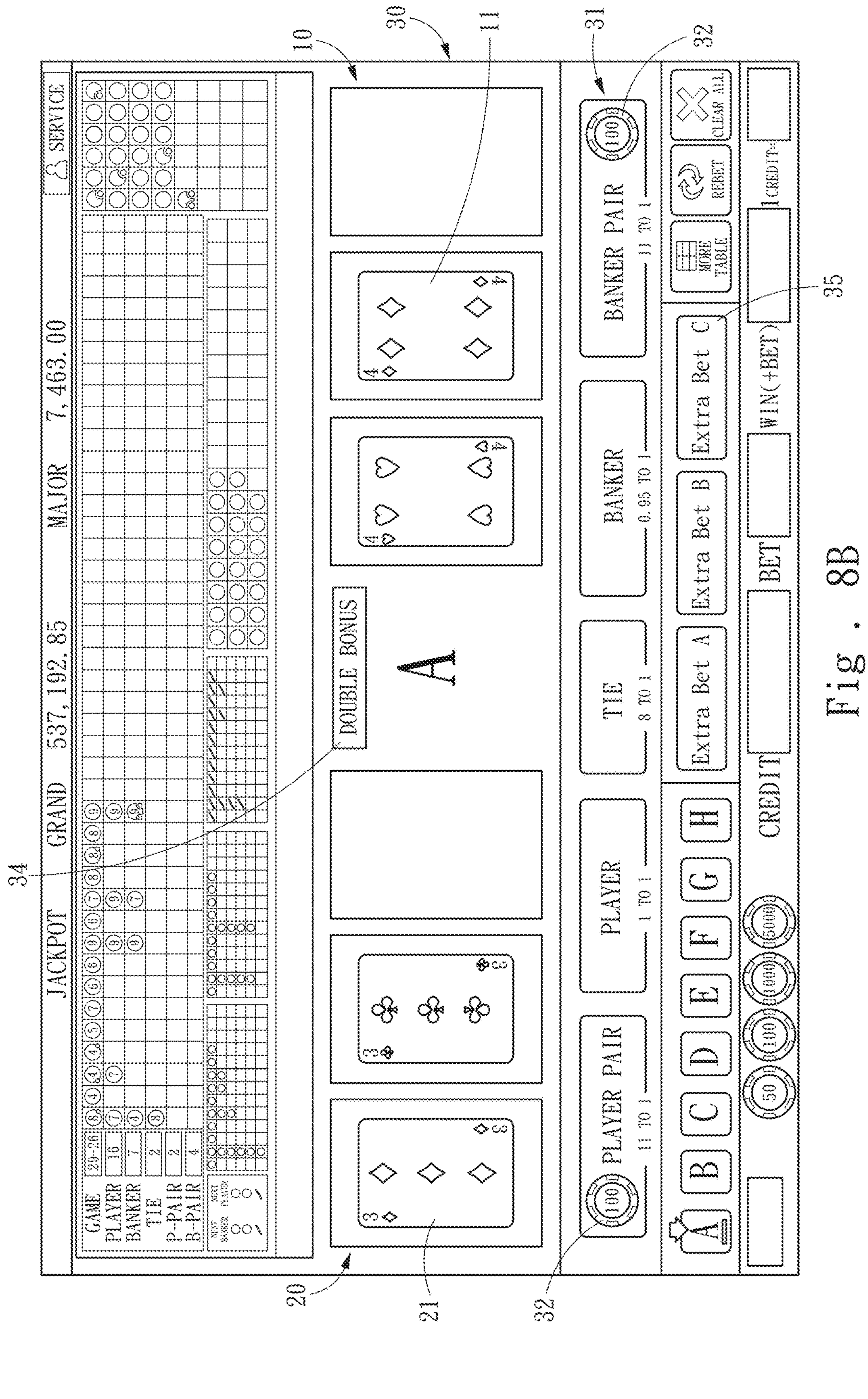

Referring to FIGS. 1, 8A and 8B, in this embodiment, the betting combination in the activation condition is that the betting zone 31 is "BANKER PAIR" and "PLAYER PAIR", the additional payout condition is that "BANKER PAIR" and "PLAYER PAIR" in the betting zone 31 match the game result which is constituted by the designated card patterns as PAIR for both the poker card pattern 11 of the banker 10 and the poker card pattern 21 of the player 20.

At this point, as shown in FIG. 8A, when the user bets on "BANKER PAIR" and "PLAYER PAIR" (the chip 32 is presented on "BANKER PAIR" and "PLAYER PAIR" in the betting zone 31), the control element 60 determines that the betting information satisfies the activation condition and generates the activation signal.

Next, as shown in FIG. 8B, the dealing element 40 starts dealing to allow the banker 10 and the player 20 obtaining the respective poker card pattern 11, 21, and generating the game result. The poker card pattern 11 is "4 of hearts, and 4 of diamonds" (PAIR), the poker card pattern 21 is "3 of diamonds, and 3 of clubs" (PAIR), and thus the game result is "BANKER, BANKER PAIR, PLAYER PAIR".

Then, the control element 60 further determines whether the game result satisfies the additional payout condition. At this point, the poker card pattern 11 "4 of hearts, and 4 of diamonds" of the banker 10 and the poker card pattern 21 "3 of diamonds, and 3 of clubs" of the player 20 are both PAIRs, and thus the control element 60 determines that the additional payout condition is satisfied and generates the additional payout signal, so as to notify the payout element 50 to additionally calculate and generate the additional payout score, and to pay the additional payout score to the user.

Fourth Embodiment

Figure 9A:
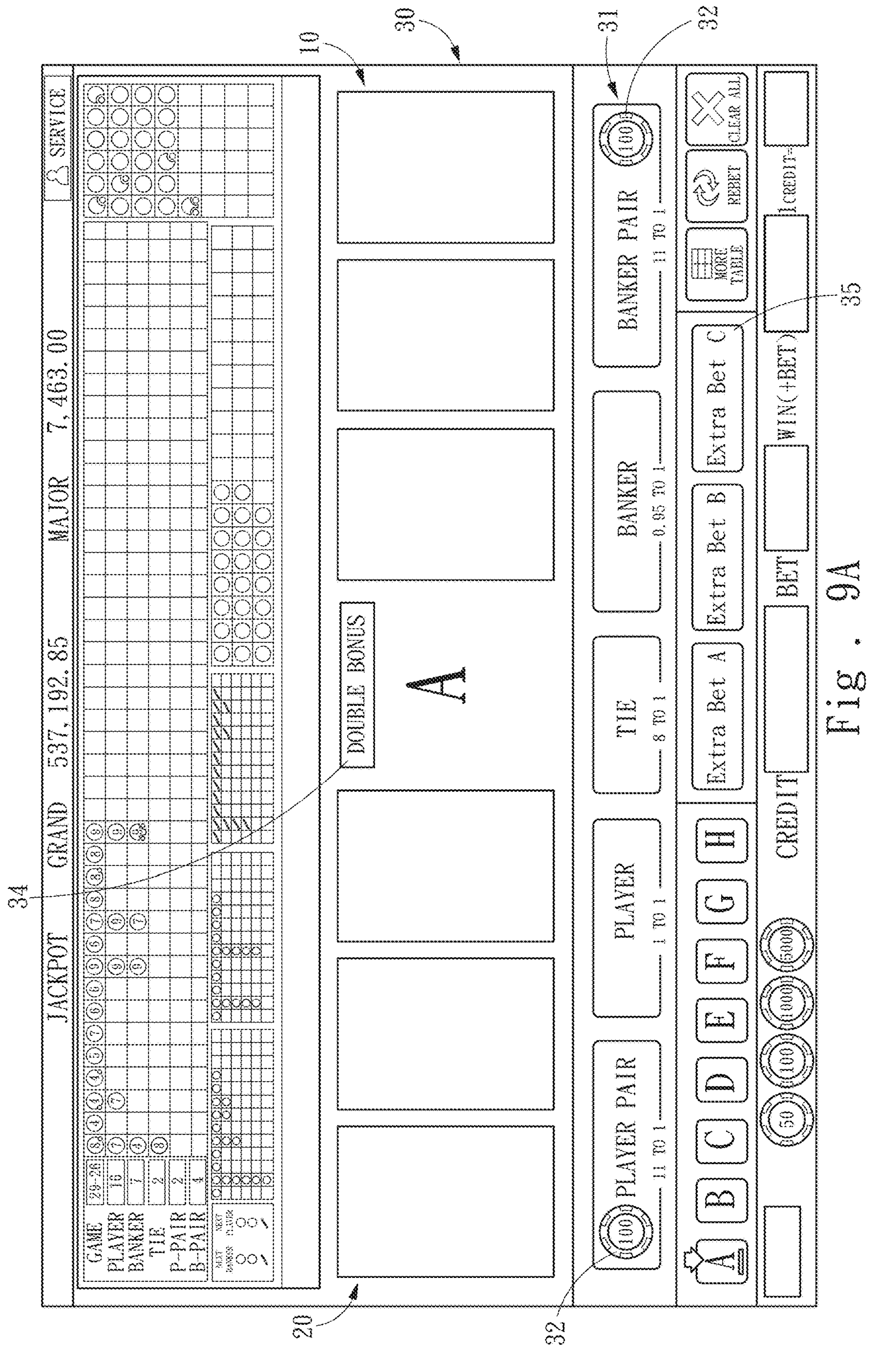
FIGS. 9A and 9B are schematic diagrams according to a fourth embodiment of the present invention.
Figure 9B:
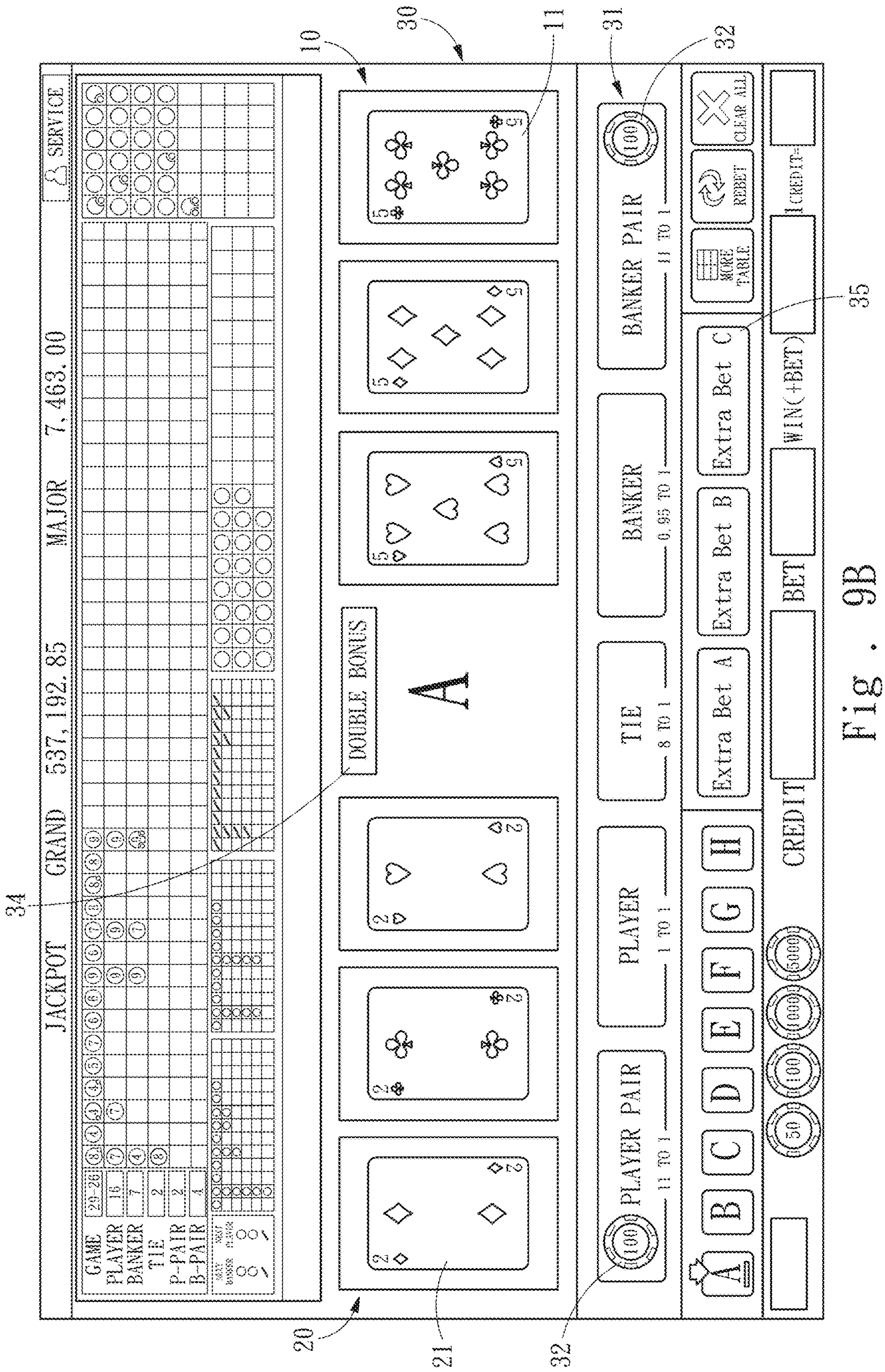

Referring to FIGS. 1A, 9A and 9B, in this embodiment, the betting combination in the activation condition is "BANKER PAIR" and "PLAYER PAIR" in the betting zone 31, the additional payout condition is that, "BANKER PAIR" and "PLAYER PAIR" in the betting zone 31 match the game result which is constituted by the designated card patterns the poker card patterns 11 as Trips for the banker 10 and the poker card pattern 21 of the player 20.

At this point, as shown in FIG. 9A, when the user bets on "BANKER PAIR" and "PLAYER PAIR" (the chip 32 is presented on "BANKER PAIR" and "PLAYER PAIR" in the betting zone 31), the control element 60 determines that the betting information satisfies the activation condition and generates the activation signal.

Next, as shown in FIG. 9B, the dealing element 40 starts dealing to allow the banker 10 and the player 20 obtaining the respective poker card pattern 11, 21, and generating the game result. The poker card pattern 11 is "5 of hearts, 5 of diamonds, and 5 of clubs" (Trips), the poker card pattern 21 is "2 of diamonds, 2 of clubs, and 2 of hearts" (Trips), and thus the game result is "PLAYER, BANKER PAIR, PLAYER PAIR".

Then, the control element 60 further determines whether the game result satisfies the additional payout condition. At this point, the poker card pattern 11 "5 of hearts, 5 of diamonds, and 5 of clubs" of the banker 10 and the poker card pattern 21 "2 of diamonds, 2 of clubs, and 2 of hearts" of the player 20 are both Trips, and thus the control element 60 determines that the additional payout condition is satisfied and generates the additional payout signal, so as to notify the payout element 50 to additionally calculate and generate the additional payout score, and to pay the additional payout score to the user.

Further, because the appearance probability that the poker card pattern 11 of the banker 10 and the poker card pattern 21 of the player 20 are both Trips (as shown in FIG. 9B) in this embodiment is far smaller than the appearance probability that the poker card pattern 11 of the banker 10 and the poker card pattern 21 of the player 20 are both PAIRs (as shown in FIG. 8B) in the third embodiment, the value of the designated payout odds in this embodiment can be increased so as to provide the user with a game of higher payout odds.

Fifth Embodiment

Figure 10A:
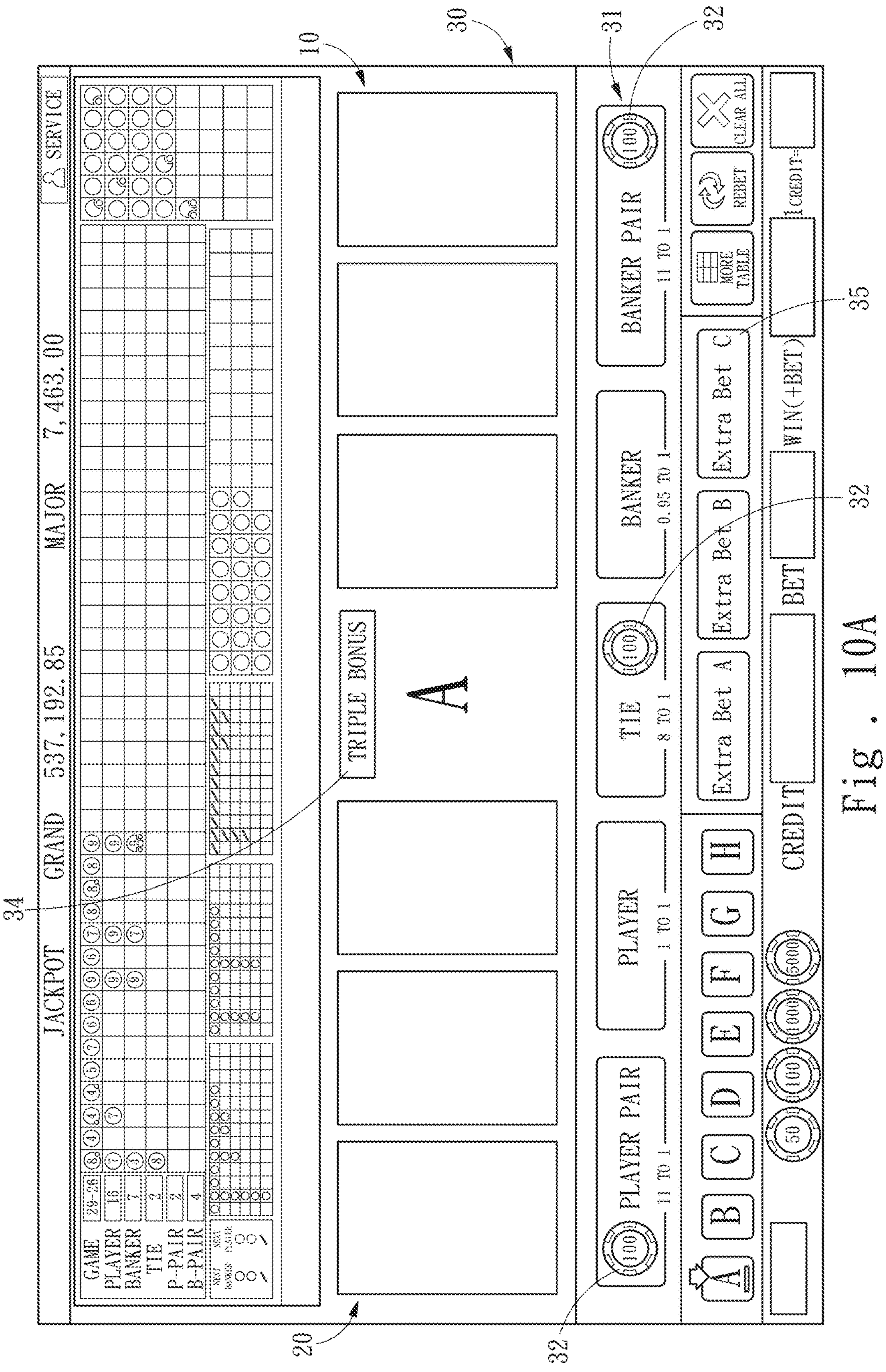
FIGS. 10A and 10B are schematic diagrams according to a fifth embodiment of the present invention.
Figure 10B:
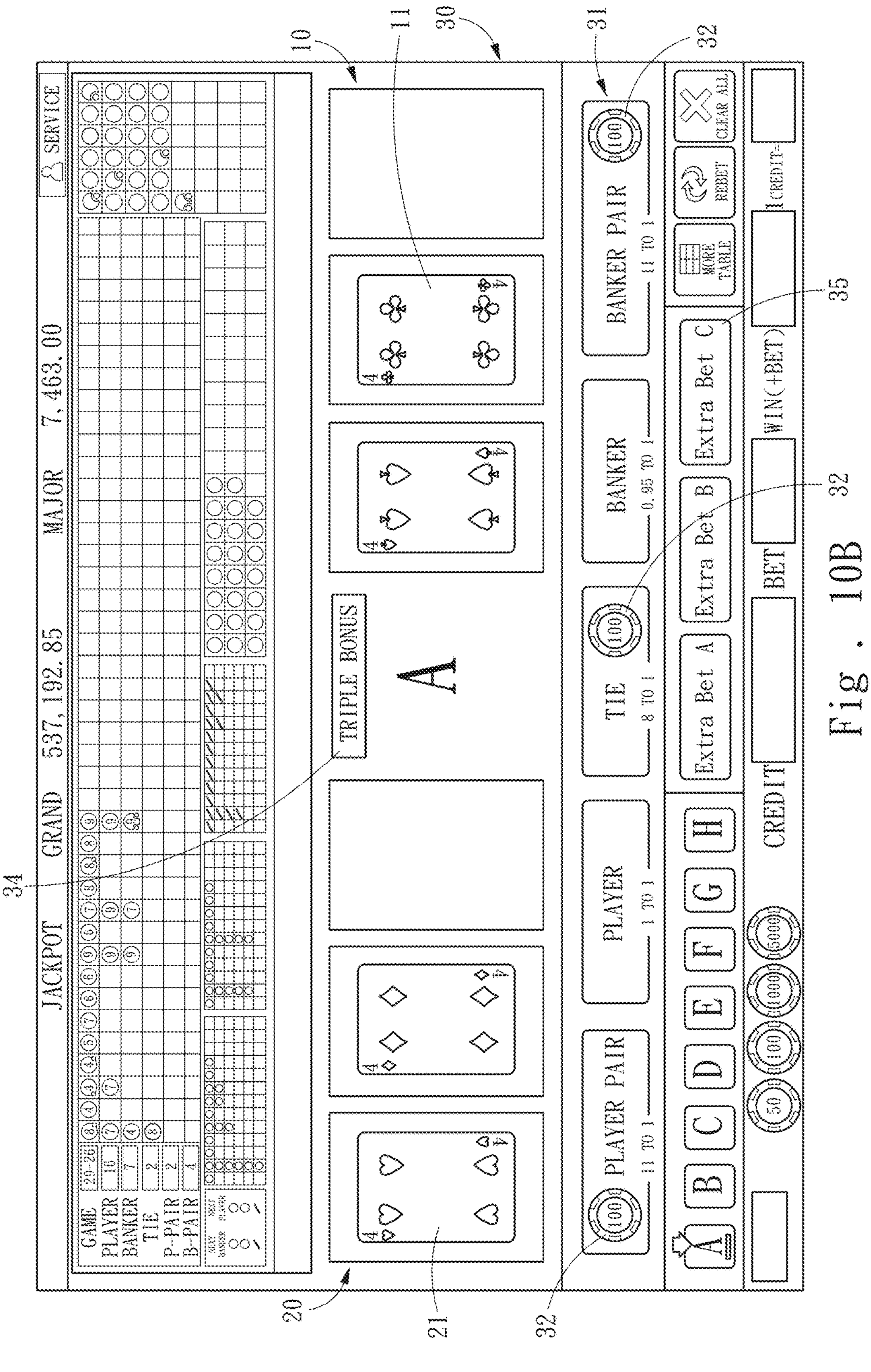

Referring to FIGS. 1, 10A and 10B, in this embodiment, the betting combination in the activation condition is "BANKER PAIR", "PLAYER PAIR" and "TIE" in the betting zone 31, the additional payout condition is that "BANKER PAIR", "PLAYER PAIR" and "TIE" in the betting zone 31 match the game result which is constituted by the designated card patterns as PAIRS and TIE for both the poker card pattern 11 of the banker 10 and the poker card pattern 21 of the player 20.

At this point, as shown in FIG. 10A, when the user bets on "BANKER PAIR", "PLAYER PAIR" and "TIE" (the chip 32 is presented on "BANKER PAIR", "PLAYER PAIR" and "TIE" in the betting zone 31), the control element 60 determines that the betting information satisfies the activation condition and generates the activation signal.

Next, as shown in FIG. 10B, the dealing element 40 starts dealing to allow the banker 10 and the player 20 obtaining the respective poker card pattern 11, 21, and generating the game result. The poker card pattern 11 is "4 of spades, and 4 of clubs" (PAIR), the poker card pattern 21 is "4 of hearts, and 4 of diamonds" (PAIR), and thus the game result is "TIE, BANKER PAIR, PLAYER PAIR".

Then, the control element 60 further determines whether the game result satisfies the additional payout condition. At this point, the poker card pattern 11 "4 of spades, and 4 of clubs" of the banker 10 and the poker card pattern 21 "4 of hearts, and 4 of diamonds" of the player 20 are both PAIRs and TIE, and thus the control element 60 notifies the payout element 50 to additionally calculate and generate the additional payout score, and to pay the additional payout score to the user.

Sixth Embodiment

Figure 11A:
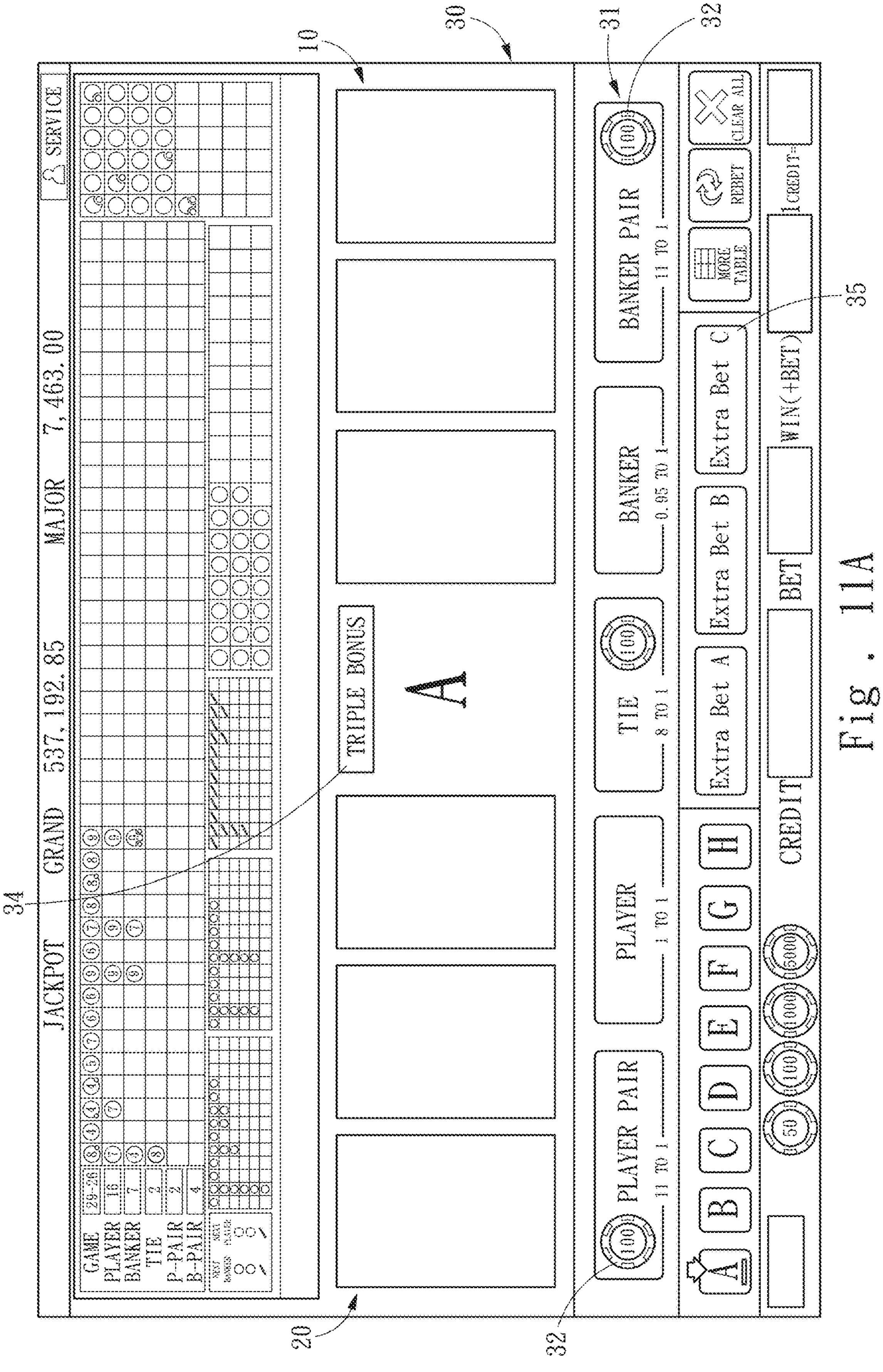
FIGS. 11A and 11B are schematic diagrams according to a sixth embodiment of the present invention.
Figure 11B:
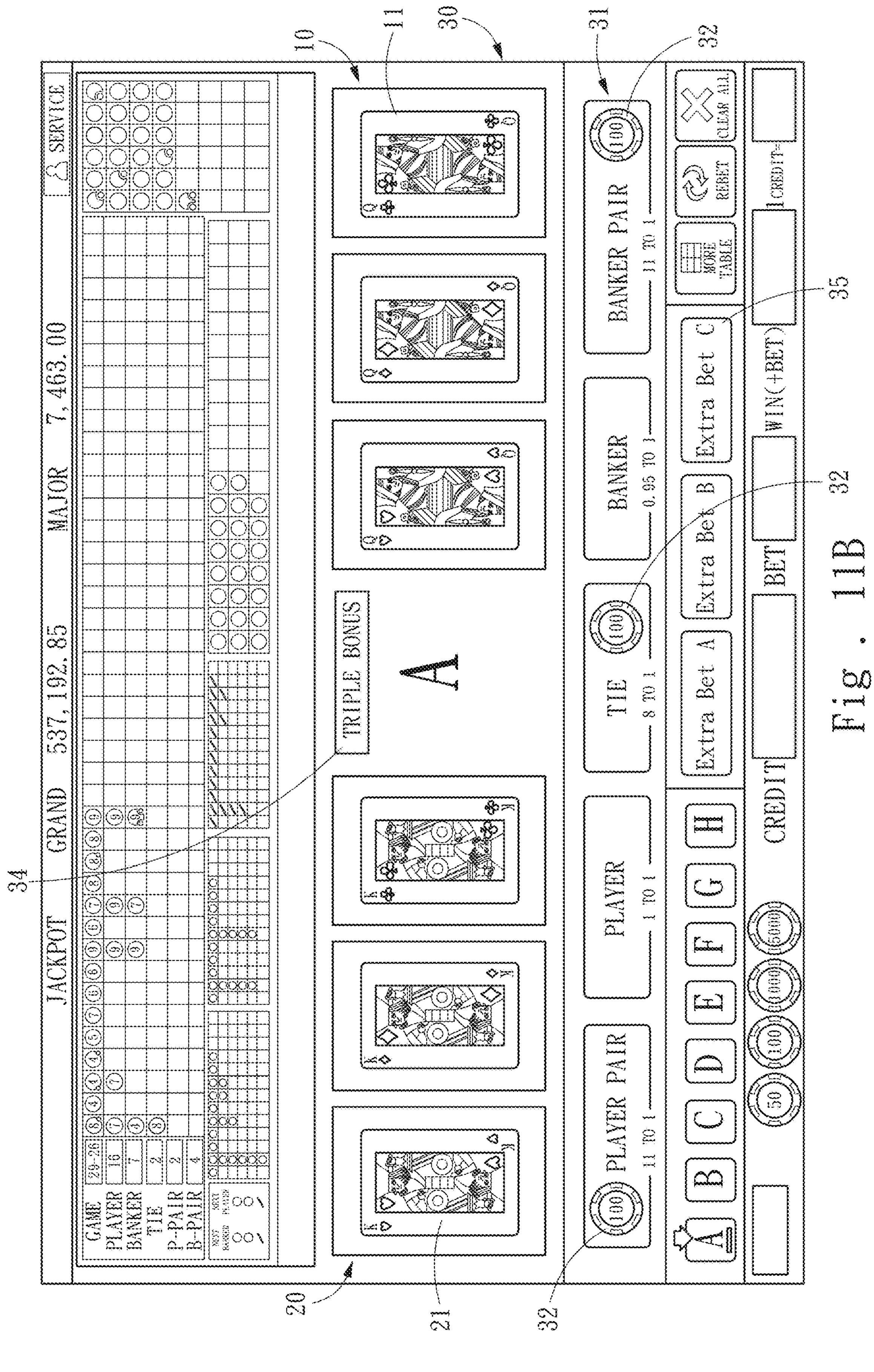

Referring to FIGS. 1, 11A and 11B, in this embodiment, the betting combination in the activation condition is "BANKER PAIR", "PLAYER PAIR" and "TIE" in the betting zone 31; the additional payout condition is that, "BANKER PAIR", "PLAYER PAIR" and "TIE" in the betting zone 31 match the game result which is constituted by the designated card patterns as Trips and TIE for both the poker card pattern 11 of the banker 10 and the poker card pattern 21 of the player 20.

At this point, as shown in FIG. 11A, when the user bets on "BANKER PAIR", "PLAYER PAIR" and "TIE" (the chip 32 is presented on "BANKER PAIR", "PLAYER PAIR" and "TIE" in the betting zone 31), the control element 60 determines that the betting information satisfies the activation condition and generates the activation signal.

Next, as shown in FIG. 11B, the dealing element 40 starts dealing to allow the banker 10 and the player 20 obtaining the respective poker card pattern 11, 21, and generating the game result. The poker card pattern 11 is "Queen of hearts, Queen of diamonds, and Queen of clubs" (Trips), the poker card pattern 21 is "King of hearts, King of diamonds, and King of clubs" (Trips), and thus the game result is "TIE, BANKER PAIR, PLAYER PAIR".

Then, the control element 60 further determines whether the game result satisfies the additional payout condition. At this point, the poker card pattern 11 "Queen of hearts, Queen of diamonds, and Queen of clubs" of the banker 10 and the poker card pattern 21 "King of hearts, King of diamonds, and King of clubs" of the player 20 both are Trips and TIE, and thus the control element 60 notifies the payout element 50 to additionally calculate and generate the additional payout score, and to pay the additional payout score to the user.

Similarly, in this embodiment, because the appearance probability that the poker card pattern 11 of the banker 10 and the poker card pattern 21 of the player 20 both are Trips and TIE (as shown in FIG. 11B) is lower, the value of the designated payout odds can be increased so as to provide the user with a game of higher payout odds.

In actual practice, there are multiple betting combinations in one activation condition, and the activation condition is considered satisfied given that any one of the betting combinations is satisfied. Therefore, the first embodiment to the sixth embodiment described above can be integrated and implemented altogether; that is, the betting combinations in the activation condition can be: 1. "BANKER PAIR" in the betting zone 31; 2. "PLAYER PAIR" in the betting zone 31; 3. "BANKER PAIR" and "PLAYER PAIR" in the betting zone 31; and 4. "BANKER PAIR", "PLAYER PAIR", and "TIE" in the betting zone 31. Given that the betting information of the user satisfies the any one of the above betting combinations, the activation condition is considered satisfied.

As shown in FIGS. 6A, 6B, 6C, 7A, 7C, 8A, 8B, 9A, 9B, 10A, 10B, 11A and 11B, the betting tabletop 30 can further include a prompt zone 34. When the user places a bet, the control element 60 in real time determines whether the betting information satisfies the activation condition and in real time displays corresponding information in the prompt zone 34 when the activation condition is satisfied, wherein the corresponding information allows the user to learn which of the betting combination is satisfied. Types of the corresponding information are described below.

As shown in FIGS. 6A and 7A, when the user bets on "BANKER PAIR" or "PLAYER PAIR", the prompt zone 34 displays the corresponding information as "SINGLE BONUS".

As shown in FIGS. 8A and 9A, when "BANKER PAIR" and "PLAYER PAIR" are betted on by the user, the prompt zone 34 displays the corresponding information as "DOUBLE BONUS".

As shown in FIG. 10A and FIG. 11A, when "BANKER PAIR", "PLAYER PAIR" and "TIE" are betted on by the user, the prompt zone 34 displays the corresponding information as "TRIPLE BONUS".

Further, as shown in FIGS. 3, 6A, 6B, 6C, 7A, 7B, 7C, 8A, 8B, 9A, 9B, 10A, 10B, 11A and 11B, the betting tabletop 30 further includes at least one additional betting option 35, each of which is activated according to a designated score with a different value which is paid by the user. In the present invention, three additional betting options 35 are used for illustrations, and are respectively represented by denotations "Extra Bet A", "Extra Bet B", and "Extra Bet C". When the additional betting option 35 is activated, the user can click any one of "Extra Bet A", "Extra Bet B", and "Extra Bet C", at the same time the user pays the designated score with a different value.

In one embodiment, there are multiple betting combinations in one activation condition. If one of the additional betting options 35 corresponding to one of the betting combinations is activated, the activation condition activates the betting combination. For example, when "Extra Bet A" is betted on, the betting combination of "BANKER PAIR" in the betting zone 31 or the betting combination of "PLAYER PAIR" in the betting zone 31 can be activated. When "Extra Bet B" is betted on, the betting combinations of "BANKER PAIR" and "PLAYER PAIR" in the betting zone 31 can be activated. When "Extra Bet C" is betted on, the betting combinations of "BANKER PAIR", "PLAYER PAIR" and "TIE" in the betting zone 31 can be activated. With the designated score that is additionally paid by the user for betting on "Extra Bet A", "Extra Bet B", and "Extra Bet C", the service provider is offered with greater profits, and thus the service provider has a larger profit margin for profits sharing, thereby increasing the value of the designated payout odds and providing the user with a game of higher payout odds.

In conclusion, the present invention at least includes the advantages below.

1. Using existing betting zones, the user can be provided with a game of higher payout odds, and a service provider is not required to re-design the betting zones to save costs.

2. The betting zones are an existing interface, and thus the user can quickly get used to bet with assurance without re-adapting a new interface.

3. The user can choose whether to bet on the designated betting zone to decide whether to take part in the game of higher payout odds, such different users that favor the game of higher payout odds and a conventional game can be simultaneously satisfied.

4. With the design of the additional betting option, the user is required to pay additional scores in order to take part in the game of higher payout odds, allowing a service provider to obtain more benefits. That is, a service provider comprises a greater profits sharing for increasing the value of the designated payout odds, allowing the user can take part in the game of higher payout odds.

5. With the prompt zone configured, the user can be attracted to place bets on the betting region, further increasing the revenue.

What is claimed is:

1. A system providing a game of higher payout odds under baccarat rules, for a user to conduct a baccarat game, the baccarat game comprising a banker and a player, the banker and the player obtaining respective poker card pattern according to the baccarat rules, the poker card pattern being selected from one of a plurality of poker card combinations, the baccarat game obtaining a game result according to the poker card pattern of the banker and the poker card pattern of the player, the system comprising:

a betting tabletop, the betting tabletop comprising five betting zones comprising respective payout odds defined according to the baccarat rules, the five betting zones respectively being BANKER, TIE, PLAYER, BANKER PAIR and PLAYER PAIR, the five betting zones respectively comprising a betting amount generated from a bet placed by the user, the betting tabletop generating a betting information according to the betting amounts of the five betting zones;

a dealing element, the dealing element comprising the banker and the player obtaining the respective poker card pattern after the user finishing the betting on the five betting zones to generate the game result;

a payout element, the payout element obtaining the betting information and the game result, the payout element calculating and generating a payout score to pay the user according to the corresponding betting amount and the corresponding payout odds while the five betting zones matching the game result; and a control element, the control element connected to the betting tabletop, the dealing element and the payout element, the control element sequentially performing steps of:

step S1: a determination procedure, determining whether the betting information satisfies an activation condition by the control element, and the control element generating an activation signal if the activation condition is satisfied, the activation condition being that at least one betting combination is satisfied; wherein the betting combination is selected from at least one of the five betting zones, and the betting combination is satisfied when the user betting all in on the at least one of the five betting zones in the betting combination;

step S2: an activation procedure, determining whether the game result satisfies an additional payout condition by the control element when the activation signal is presented, and the control element generating an additional payout signal if the additional payout condition is satisfied, wherein the additional payout condition is that apart from the at least one of the five betting zones of the betting combination satisfying the activation condition that matches the game result, the poker card pattern of the banker and the poker card pattern of the player constituting of the game result further matches a designated card pattern comprising an appearance probability; and step S3: an additional payout procedure, notifying the payout element by the control element when the addition payout signal is presented, allowing the payout element additionally calculating and generating and additional payout score according to the betting amount of the betting zone corresponding to the game result and a designated payout odds which is predetermined, and the payout element paying the additional payout score to the user; wherein a value relationship between the designated payout odds and the appearance probability of the designated card pattern is a negative correlation.

2. The system providing a game of higher payout odds under baccarat rules of claim 1, wherein after the user finishing the betting and before the payout element generating the payout odds, the control element selecting at least one of the five betting zones and allowing the payout odds of the five betting zones that being selected to be replaced by a random odds.

3. The system providing a game of higher payout odds under baccarat rules of claim 2, wherein a time point at which the payout odds of the five betting zones that being selected to be replaced by the random odds is before the game result is generated.

4. The system providing a game of higher payout odds under baccarat rules of claim 2, wherein a time point at which the payout odds of the five betting zones that being selected to be replaced by the random odds is after the game result is generated.

5. The system providing a game of higher payout odds under baccarat rules of claim 1, wherein the betting tabletop further comprises at least one additional betting option, each of the additional betting option is activated according to a designated score with a different value which is paid by the user, and when there are multiple betting combinations in one activation condition, one of the betting combination is activated while one of the additional betting options corresponding to the betting combination is activated.

6. The system providing a game of higher payout odds under baccarat rules of claim 1, wherein the betting tabletop further comprises a prompt zone, and when the user places a bet, the control element in real time determines whether the betting information satisfies the activation condition, and in real time displays corresponding information in the prompt zone when the activation condition is satisfied.

7. The system providing a game of higher payout odds under baccarat rules of claim 1, wherein the betting tabletop, the dealing element, the payout element and the control element are integrated in a gaming machine.

8. The system providing a game of higher payout odds under baccarat rules of claim 7, wherein the gaming machine comprises a display operation interface, and the display operation interface is a touch screen for displaying the betting tabletop.

9. The system providing a game of higher payout odds under baccarat rules of claim 7, wherein the dealing element is a random number generating element and is integrated in the gaming machine.

10. The system providing a game of higher payout odds under baccarat rules of claim 1, wherein the dealing element is an automated dealing arm.

* * * * *